(12) United States Patent  (10) Patent No.: US 7,916,909 B2
Khazen et al.  (45) Date of Patent:  Mar. 29, 2011

(54) METHOD AND MEANS FOR IMAGE PROCESSING

(75) Inventors: Michael Khazen, Sutton (GB); Martin O Leach, Ashurt Wood (GB)

(73) Assignees: The Institute of Cancer Research, London (GB); Royal Cancer Hospital; The Royal Marsden NHS Foundation Trust

( * ) Notice: Subject to any disclaimer, the term of this patent is extended or adjusted under 35 U.S.C. 154(b) by 1106 days.

(21) Appl. No.: 10/578,756

(22) PCT Filed: Nov. 11, 2004

(86) PCT No.: PCT/GB2004/004760
§ 371 (c)(1),
(2), (4) Date: Jan. 18, 2007

(87) PCT Pub. No.: WO2005/048161
PCT Pub. Date: May 26, 2005

(65) Prior Publication Data
US 2007/0211958 A1  Sep. 13, 2007

(30) Foreign Application Priority Data
Nov. 12, 2003 (GB) .................................. 0326381.1

(51) Int. Cl.
*G06K 9/00* (2006.01)
(52) U.S. Cl. ....................................... 382/128; 382/130
(58) Field of Classification Search .................. 382/128, 382/130, 131
See application file for complete search history.

(56) References Cited

U.S. PATENT DOCUMENTS

| 4,437,161 A | 3/1984 | Anderson |
| 2005/0074149 A1* | 4/2005 | Niemeyer ...................... 382/128 |
| 2009/0080724 A1* | 3/2009 | Nanbu ........................... 382/128 |

OTHER PUBLICATIONS

Gilhuijs, K. et al., "Computerized analysis of breast lesions in three dimensions using dynamic magnetic-resonance imaging" Med. Phys. 25 (9): 1647-1654 (Sep. 1998).
Rogowska, J. et al., "Applications of Similarity Mapping in Dynamic MRI" IEEE Transactions on Medical Imaging 14 (3): 7 pages, New York (Sep. 1995).
Sebastiani, G., et al., "Analysis of Dynamic Magnetic Resonance Images" IEEE Transactions on Medical Imaging 15 (3): 10 pages (Jun. 1996).
Wu, Y. T., et al., "Classifying Hemodynamics of MR Brain Perfusion Images Using Independent Component Analysis (ICA)" IJCNN 2003. Proceedings of the International Joint Conference on Neural Networks 2003. Portland, OR, Jul. 20-24, 2003, International Joint Conference on Neural Networks, New York, NY: IEEE, US, vol. 4 of 4, Jul. 20, 2003: 616-621.

(Continued)

*Primary Examiner* — John B Strege
(74) *Attorney, Agent, or Firm* — Niels Haun; Dann, Dorfman, Herrell & Skillman, P.C.

(57) ABSTRACT

A method and means enabling identification in an NMR image, being one of a time-sequence of images recording induced changes in pixel values of successive images of a subject (such as post-contrast dynamic images), the contribution to the image arising from the presence within the image subject of a specified tissue (e.g. fat). This identification is done using a statistical measure derived from the dynamic data (e.g. pixel value changes due to contrast agent uptake) taken from a plurality of the separate images forming the time-sequence.

32 Claims, 11 Drawing Sheets

OTHER PUBLICATIONS

International Search Report for International application No. PCT/GB2004/004760 dated Feb. 24, 2005.
Informal Comments to The International Bureau of WIPO dated Jun. 6, 2005.
Elion, J.L., et al., "A Knowledge-Based Image Processing System for The Interpretation of Coronary Arteriograms", SPIE, 1987, vol. 767, pp. 428-432.
Elion, J. L., et al., "Classification of Cardiac Structures in Digital Angiograms By The Analysis of Pixel Variance", Comuters in Cardiology, 1987, pp. 69-72.
Martel, A.L., et al., "The Use of PCA to Smooth Functional MRI Images", Medical Image Understanding and Analysis, Oxford, UK: BMVA; 1997, pp. 13-16.
Fink, D., et al. (editors), "Electronics Engineers' Handbook", McGraw-Hill, Third Edition, 1989, Section 25, pp. 112-133.
UK Search Report under Section 17 dated Sep. 29, 2004.
Yu-Tewu, et al., "Classifying hemodynamics of MR brain perfusion images using inftendent component analysis (ICA)", Proceedings of the International Joint Conference on Neural Networks 2003, Portland, OR, Jul. 20-24, 2003, International Joint Conference on Neural Networks, NY, NY, US, vol. 4 of 4, Jul. 20, 2003, pp. 616-621.
Gilhuijs, K., et al., "Computerized analysis of breast lesions in three dimensions using dynamic magnetic-resonance imaging", Medical Physics, American Institute of Physics, NY, US, vol. 25, No. 9, Sep. 1998, pp. 1647-1654.
Rogowska, J., et al., "Applications of Similarity Mapping in Dynamic MRI", Transactions on Medical Imaging, IEEE Inc., NY, US, vol. 14, No. 3, Sep. 1, 1995, pp. 480-486.
Sebastiani, G., et al., "Analysis of Dynamic Magnetic Resonance Images", IEEE Transactions of Medical Imaging, vol. 15, No. 3, Jun. 1996, pp. 268-277.
International Search Report dated Feb. 25, 2005.

\* cited by examiner

METHOD AND MEANS FOR IMAGE PROCESSING

The present invention relates to methods and means for image processing and, particularly, though not exclusively, to the processing of Nuclear Magnetic Resonance image data.

Dynamic imaging, such as dynamic MR imaging, may involve the acquisition of a time-series of image data sets in which each data set is able to represent an image of the subject fully in 2 or 3 dimensions at one of a series of successive instants (or brief periods) in time. Dynamic imaging is often used to record the internal changes in properties of a stationary subject which are induced by a controlled change-inducing influence. An example of this is contrast-enhanced medical MR imaging in which a "contrast agent" is introduced into a stationary subject (e.g. a person) which is detectable as an increase in the image contrast/brightness of those internal parts of the subject in which the agent is located.

An analysis of the change in image properties (e.g. in image contrast/brightness), over time, of chosen fixed points or static regions within the imaged volume of the subject enables an assessment of the properties of the chosen fixed points/regions within that imaged volume.

For example, the image analysis procedure in breast dynamic imaging typically involves localisation of a lesion within an image of the subject containing a contrast agent. According to present image analysis procedures, the pixel value of each pixel within an image of the subject containing a contrast agent (post-contrast images) has subtracted from it the pixel value of the corresponding pixel located at the same image point within an image of the same subject taken prior to introduction of the contrast agent thereto (pre-contrast image). The result is a "subtraction image" which ideally includes only the effects of the contrast agent upon the subject.

In many situations the image subject (e.g. region of a body, such as a breast) contains a high content of material (e.g. fat) other than the material of interest which may obscure relevant image features (e.g. lesion shape features) within a post-contrast image. This is especially so in breast-scan images. While the technique of generating subtraction images aims to remove the contribution to, or part of, the image arising from fat (and other materials to which the use of the contrast agent was not directed), this can never be fully achieved due to the fact that materials (especially fat) other than the material of interest may often also be enhanced to a small extent by the presence of a contrast agent. Thus, even a subtraction image is likely to suffer the obscuring effects discussed above arising from undesired image contrast enhancement.

Analysis of lesion shape within an image and of the pattern of enhancement due to contrast agent uptake may make a valuable contribution to diagnosis. The analysis of lesion shape can only be considered reliable in cases where the tumour extent is properly segmented within the image being studied. The "traditional" approach to this problem is manual segmentation of the tumour region within subtraction images (e.g. by a radiologist). Even if the shape obscuring tissue is not enhancing, it cannot be eliminated using the subtraction technique because of noise present in the pre-contrast and/or post-contrast image data. As a result the tumour-outlining contour so produced is not always well defined.

Moreover, merely segmenting the outlining image contour of a tumour image may not be satisfactory/sufficient if the tumour in question has a heterogeneous structure, which is not clearly seen on a subtracted image. As a result the pattern of contrast enhancement is not always clearly seen on the subtraction image. Furthermore, a subtraction image alone does not always permit one to discriminate between tumour and other enhancing tissues, e.g. blood vessels.

The present invention aims to overcome at least some of the above deficiencies of the prior art.

The present invention, at its most general, proposes to provide a method and/or means enabling one to identify in an image, being one of a time-sequence of images recording induced changes in pixel values of successive images of a subject (such as post-contrast dynamic images), the contribution to the image arising from the presence within the image subject of a specified material/tissue (such non-enhancing and/or low-enhancing material, e.g. fat). This identification is proposed to be done using a statistical measure derived from the dynamic data (e.g. pixel value changes due to contrast agent uptake) taken from a plurality of the separate images forming the time-sequence.

In the case of a time-sequence of images recording the development of contrast-enhancement in a subject, this is preferably done in respect of individual image pixels (or "voxels" in a 3D image) from information contained in the. pixel intensity data recording the contrast enhancement of the subject at a point or pixel location therein. Thus, the statistical measure is most preferably derived according to the variation over time of the pixel intensity at an individual image pixel location (i.e. the "uptake curves" representing contrast enhancement due to contrast agent uptake over time at a given imaged point).

The pixel intensity of a given pixel changes over time either predominantly in response to a deliberate induced effect (e.g. the presence of a contrast enhancing agent) at the location within the subject represented by the pixel, and/or due to image noise. Different material/tissue types respond differently to the presence of a contrast enhancing agent and the present invention proposes a method and means for utilising this fact in identifying different materials within the image of a subject, using a statistical measure of the induced image pixel value changes (over time) which has been found to be tissue-specific.

The invention is particularly suited to identifying fat and/or fatty tissues within the image of a subject and it has been found that the statistical measures described herein are particularly well suited to identifying the present of such tissues specifically.

It is to be understood that the present invention is not limited to the processing of Nuclear Magnetic Resonance image data and is applicable to the processing of image data acquired via other means and in respect of any subject.

Accordingly, in a first of its aspects, the present invention may provide a method of processing a time-sequence of separate image data sets which records induced changes in pixel values of successive images of a subject, each set comprising a plurality of image data items which each represent the location of an image pixel of the image subject according to a common reference frame within which the subject is located, the method including the steps of:

(a) selecting from each of a plurality of the separate image data sets an image data item which represents an image pixel located at the same fixed image pixel location, thereby to generate a time-domain image data set preferably containing only image data items which represent an image pixel at the same said pixel location;

(b) determining according to a measure (e.g. predetermined) of said induced changes or differences as between the (preferably all of the) pixel values of the image data items of the time-domain image data set whether the image data items thereof are associated with the presence of a specified material (most preferably a tissue, e.g. fat) within the image subject.

There may then follow an additional step (c), following step (b), of identifying or classifying the image data items of the time-domain image data set as being unsuitable for use in the generation of an image of the subject if they are identified in step (b) as being associated with the presence of the specified material or tissue (e.g. fat) within the image subject and if the specified material or tissue is of a type which it is not desired to be included within the image of the subject.

Otherwise, the image data items in question may be identified/classified as being suitable for use in image generation of the subject.

Thus, the time-domain image data set contains information regarding exclusively the image pixels representing the same location within the common reference frame of each of the plurality of successive images in the time-sequence of images. Most preferably each and all of the data items within the time-domain image data set are employed in determining whether or not the image data items thereof correspond with the specified material/tissue (e.g. in determining the measure). For example, the measure may be a measure of, or be sensitive to, differences between each pixel value in the time-domain image data set as compared to each other such pixel value. The result is that the measure is then sensitive to the general dispersion of pixel values forming the time-domain image data set, and can provide a measure of how similar/different the image pixel values are collectively.

By analysing the information contained in this dynamic time-domain image data set, one is able to derive information in respect of any one of the plurality of separate image data sets within the time-sequence which would not be derivable from that one image data set alone—namely, whether a pixel value therein results from a specified material or tissue (e.g. fat or fatty tissues) within the image subject, or otherwise.

The measure of the induced effect may be any one of a number of measures, which enable, from an analysis of the time-development of the intensity value of a pixel at the same location within each of the separate images in the time-sequence, whether that development arose predominantly due to a specific material or tissue (e.g. fat). Such measures as would be readily apparent to the skilled person may be employed according to the present invention. However, the measures described herein have been found to be specifically suited to identifying the presence of fat and fatty tissues as discussed below.

Where the pixel location of an image is non-responsive or only weakly responsive to an inducement to changes in its pixel value, when the imaged subject is exposed to a deliberate change-inducing influence or agent, the value of the pixel at that location is likely to be the same (or similar) in each of the images within the time-sequence. Conversely, if the location is strongly responsive to such inducements to changes in its pixel value, the value of the pixel at that location is likely to change significantly over time within the time sequence.

Accordingly, the measure is most preferably defined according to a measure of the dispersion of, or differences between, the values of pixel intensity associated with the image data items within the time-domain image data set. If only a small degree of difference (as between values) in such pixel intensity values exists when considering all pixel values represented within the time-domain image data set, this amounts to a small dispersion in pixel intensity values and suggests the observed dispersion results from the pixel values representing tissue/material (e.g. fat) within the imaged subject which is non-responsive or only weakly responsive to the inducements to change. The image data items of the time-domain image data set may be so classified and may be identified as being not suitable for use in the generation of an image of the subject. Conversely, large values of dispersion suggest the observed dispersion arises from materials strongly responsive to the inducement to change and may be so classified. These image data items of the time-domain image may also be classified as being suitable for use in the generation of an image of the subject.

Preferably, the image data items of the time-domain image are determined as being associated with the presence within the image subject of the specified material if the measure exceeds a predetermined threshold value. Preferably, the predetermined threshold is a value of the measure of dispersion in the values of pixel intensity associated with the image data items. within the time-domain image data set.

For example, the measure (e.g. of dispersion) may be determined according to the extent to which the pixel values represented by the image data items of the time-domain image data set differ from equality (i.e. the extent to which they do not all share the same value). To this extent, the measure (e.g. of dispersion) may be determined according to the degree to which a time-domain image vector differs from an identity vector in the same vector space. Each vector component of the time-domain image vector is preferably represented by a unique image data item of the time-domain image data set. Preferably, the array of vector components is arranged in time-sequence. All vector components of the identity vector share the same value (preferably, the value 1 (one)).

The degree of difference (and therefore the measure e.g. of dispersion) may be the angle subtended by the time-domain image vector with respect to the identity vector. Indeed, the measure of dispersion may be determined according to any suitable property of the time-domain vector in vector space. Preferably, the property in question is a property of the vector as a whole (e.g. its angle relative to another as above).

For example, step (b) of the method of the present invention in its first aspect may include:

forming a time-domain image vector wherein each image data item of the time-domain image data set represents a separate vector component of the time-domain image vector (e.g. an array of vector components arranged in the time-sequence to form the vector); and determining the measure according to a property of the time-domain image vector.

For example, determining the measure could include determining the angle ($\alpha$) subtended by the time-domain image vector with respect to the identity vector (preferably in the vector space of the time-domain image vector); and, employing the angle ($\alpha$) as the measure. The predetermined threshold value discussed herein is then preferably a predetermined value of the measure.

Alternatively, the measure e.g. of dispersion in the values of pixel intensity associated with the image data items within the time-domain image data set may be determined according to a property or properties of one or more of the principal components of the time-domain image vector determined according to a principal component decomposition of the time-domain image vector.

It has been found that the value of the second principal component (that is, the principal component associated with the second largest eigenvalue of the Principal Component Analysis (PCA)) provides a reliable measure of the dispersion in the values of pixel intensity associated with the image data items within the time-domain image data set. Preferably, the predetermined threshold is a predetermined value of the second principal component of the time-domain image vector. Preferably, the predetermined threshold value is exceeded if the value of the second principal component is greater than zero.

For example, step (b) may include:
  forming a time-domain image vector wherein each image data item of the time-domain image data set represents a separate vector component of (e.g. an array of vector components arranged in the time-sequence to form . . . ) the time-domain image vector;
  determining the second principal component of the time-domain image vector; and,
  employing the value of the second principal component as the measure. The predetermined threshold discussed herein value may then preferably be a predetermined value of the measure.

Where step (b) includes the calculation of the angle ($\alpha$) the predetermined threshold value may be deemed to be exceeded if the angle ($\alpha$) is less than a threshold angle value ($\alpha_0$). The threshold value ($\alpha_0$) may be arbitrarily set by the user, but is preferably determined according to the distribution of the angular values ($\alpha$) of the time-domain image vectors associated with a plurality of (preferably all of) the image pixel locations represented in the time-sequence of data sets.

The method may include:
  repeating step (a) in respect of a plurality of image data items thereby to generate a corresponding plurality of time-domain image data sets; and
  forming a corresponding plurality of time-domain image vectors with each image data item of a given time-domain image data set representing a separate vector component of (e.g. an array of vector components arranged in the time-sequence to form . . . ) the given time-domain image vector; then
  determining the angle subtended by each of the time-domain image vectors with respect to the identity vector e.g. in the vector space of the time-domain image vector; and,
  determining from the distribution of the values of the angles (preferably the values of the natural logarithm of the angles) of all of the time-domain vectors the portion of the angular distribution arising mainly, predominantly, or substantially only from the presence of the specified material within the image subject. The predetermined threshold value may then be deemed to be exceeded if the angle subtended by the time-domain image vector falls within, or contributes to, the portion of the angular distribution arising from the specified tissue/material (e.g. fat).

Preferably, the threshold angle value ($\alpha_0$) is the angular value which demarcates the portion of the angular distribution arising mainly, predominantly, or substantially only from the specified tissue/material from the other portion(s) of the angular distribution.

For example, the portion of the angular distribution arising mainly, predominantly, or substantially only from the specified tissue/material may be determined according to a Normal Distribution having distribution parameters which cause it to most closely correspond with a portion of the angular distribution. Demarcation may be performed graphically/visually, or may be performed analytically and automatically using, for example, the well-known ROC technique in a manner such as would be readily apparent to the skilled person ("Receiver Operating Characteristics": see D J Fink and D Christiansen, Electronic Engineer's Handbook, McGraw-Hill, $3^{rd}$ edition (1989), section 25, pp 119-120).

The method of processing image data, in its first aspect, preferably includes the additional step of:
  (d) replacing by a value of zero the pixel value of each image data item of each of the plurality of the separate image data sets identified as being unsuitable for use in the generation of an image of the subject. In this way, separate image data sets of the time-sequence may be processed to remove tissue/material-specific pixels values therefrom leaving unchanged only those pixels which have been processed only if they have been deemed suitable for use in image formation.

Furthermore, the removal of noise from the image data may be achieved by decomposing according to a principal value decomposition the/each time-domain image vector which has been deemed suitable for use in image formation, and discarding from the decomposed vector those principal components which are deemed to arise predominantly from random causes.

For example, the method may also include representing the time-domain image vector in terms of a principal component decomposition thereof employing all principal component vectors and corresponding principal component values thereof except: those principal component values thereof not exceeding a predetermined magnitude; and,
  replacing by a value determined according to the principal component decomposition the pixel value of each image data item of each of the plurality of the separate image data sets identified as being suitable for use in the generation of an image of the subject.

However, it has also been found that the first (largest) principal component of a time-domain image vector generally corresponds to the image data common to all images of the time-sequence. Thus, in the case where the time-sequence records contrast enhancement beginning with a pre-contrast image, the first principal component of each time-domain image vector of the sequence approximately represents the information contained within the pre-contrast image data set, that being the first set within the time-sequence. Subtraction of this information from the time-domain image vectors will result in the maximisation of the differences between different time-domain image vectors (e.g. uptake curves) by removing the information which is common to all time-domain image vectors (e.g. uptake curves). The term "subtraction" is to be understand to refer to the reconstruction of a vector using its principal components except (i.e. omitting) its $1^{st}$ principal component.

Thus, the method may also include representing the time-domain image vector in terms of a principal component decomposition thereof employing all principal component vectors and corresponding principal component values thereof except: those principal component values thereof not exceeding a predetermined magnitude; and/or the largest principal component value thereof; and,
  replacing by a value determined according to the principal component decomposition the pixel value of each image data item of each of the plurality of the separate image data sets identified as being suitable for use in the generation of an image of the subject.

Preferably, the method of processing according to the invention in its first aspect, includes repeating steps (a) and (b), or steps (a) to (c), (including any of the preferable/alternative features described above) in respect of pixels at each pixel location represented within the time-sequence of separate image data sets. Thus, preferably all image pixels are processed as above. Of course, the present invention may provide a method of forming an image from image data comprised in the time-sequence of separate image data sets having been processed according to the invention in its first aspect (including any of the preferable/alternative features described above).

It is to be understood that the present invention may provide means arranged to, or suitable for, the implementation of the invention in its first aspect. Accordingly, it is to be understood that the present invention encompasses such means.

For example, in a second of its aspects, the present invention may provide an image processing means for processing a time-sequence of separate image data sets which record induced changes in pixel values of successive images of a subject, each set comprising a plurality of image data items which each represent the location of an image pixel of the image subject according to a common reference frame within which the subject is located, the image processing means including:

(a) selection means for selecting from each of a plurality of the separate image data sets an image data item which represents an image pixel located at the same fixed image pixel location, thereby to generate a time-domain image data set preferably containing only image data items which represent an image pixel at the same said image pixel location;

(b) decision means for determining according to a measure of said induced changes as between preferably all of the pixel values of the image data items of the time-domain image data set whether the image data items thereof are associated with the presence of a specified tissue/material within the image subject.

The apparatus may also include:

(c) identifying means arranged to identify or classify the image data items of the time-domain image data set as being unsuitable for use in the generation of an image of the subject if they are identified by said decision means (b) as being associated with the presence of the specified material within the image subject and if the specified material is of a type which it is not desired to be included within the image of the subject. The identifying means may be arranged to otherwise identify the image data items in question as being suitable for use in image generation of the subject.

Preferably, the decision means is arranged to determine that the image data items of the time-domain image are associated with the specified material if the measure exceeds a predetermined threshold value. Preferably, the predetermined threshold is a predetermined value of the measure of dispersion in the values of pixel intensity associated with the image data items within the time-domain image data set.

To this extent, the measure e.g. of dispersion may be determined according to the degree to which a time-domain image vector differs from an identity vector in the same vector space, wherein each vector component of the time-domain image vector is represented by a unique image data item of the time-domain image data set (e.g. the array of vector components being arranged in time-sequence), and all vector component of the identity vector share the same value. The degree of difference (and therefore the measure of dispersion) may be the angle subtended by the time-domain image vector with respect to the identity vector.

The decision means may include:
vector means for forming a time-domain image vector wherein each image data item of the time-domain image data set represents a separate vector component of the time-domain image vector (e.g. an array of vector components arranged in the time-sequence to form the vector);

angle determining means for determining the angle ($\alpha$) subtended by the time-domain image vector with respect to the identity vector e.g. in the vector space of the time-domain image vector.

The decision means is preferably arranged to employ the angle ($\alpha$) as the measure, and the predetermined threshold value is preferably a predetermined value of the predetermined measure.

Alternatively, or additionally, the decision means may include:
vector means for forming a time-domain image vector wherein each image data item of the time-domain image data set represents a separate vector component of (e.g. an array of vector components arranged in the time-sequence) the time-domain image vector;
principal component means for determining the second principal component of the time-domain image vector;
wherein the decision means is arranged to employ the value of the second principal component as the measure. The predetermined threshold value is then preferably a predetermined value of the measure. Preferably, the predetermined threshold is exceeded if value of the second principal component is greater than zero.

Where the decision means employs the angle ($\alpha$), the predetermined threshold value may be deemed to be exceeded if the angle ($\alpha$) is less than a threshold angle value ($\alpha_0$).

The selection means is preferably arranged to generate in respect of a plurality of image data items a corresponding plurality of time-domain image data sets;
the vector means is preferably arranged to form a corresponding plurality of time-domain image vectors with each image data item of a given time-domain image data set representing a separate vector component of (e.g. an array of vector components arranged in the time-sequence) the given time-domain image vector.

The angle determining means is preferably arranged to determine the angle subtended by each of the time-domain image vectors with respect to the identity vector in the vector space of the time-domain image vector; and,
the decision means is preferably arranged to determine from the distribution of the values of the angles (preferably the values of the natural logarithm of the angles) of all of the time-domain vectors the portion of the angular distribution arising predominantly, mainly, or substantially only from the presence of the specified material within the image subject. The predetermined threshold value may then be deemed to be exceeded if the angle subtended by the time-domain image vector falls within the portion of the angular distribution arising from the specified material.

Preferably, the threshold angle value ($\alpha_0$) is the angular value which demarcates the portion of the angular distribution arising substantially only from the specified material from the other portion(s) of the angular distribution.

The decision means may be arranged to determine the portion of the angular distribution arising substantially only from the specified material according to a Normal Distribution having distribution parameters which cause it to most closely correspond with a portion of the angular distribution.

The image processing means of the present invention, in its second aspect, preferably includes:
(d) data modifying means arranged to replace by a value of zero the pixel value of each image data item of each of the plurality of the separate image data sets identified by the identifying means (c) as being unsuitable for use in the generation of an image of the subject.

The principal component means is preferably arranged to represent the time-domain image vector in terms of a principal component decomposition thereof employing all principal component vectors and corresponding principal component values thereof except: the largest principal component value thereof; and those principal component values thereof not exceeding a predetermined magnitude.

The image processing means preferably further includes data modifying means arranged to replace by a value determined according to the principal component decomposition the pixel value of each image data item of each of the plurality of the separate image data sets identified as being suitable for use in the generation of an image of the subject.

The image processing means of the present invention, according to its second aspect is preferably arranged to process each pixel of each of the time-sequence of separate image data sets.

The image processing means preferably includes image forming means for forming an image from image data comprised in the time-sequence of separate image data sets having been processed by the image processing means according to the invention in its second aspect (including any of the aforementioned preferable/alternative features thereof).

The invention may provide computer means programmed to perform the method according to the invention in its first aspect (including any of the aforementioned preferable/alternative features thereof). The invention may provide a computer program product containing a computer program for performing the method according to the invention in its first aspect (including any of the aforementioned preferable/alternative features thereof). The invention may provide a computer program for performing the method according to the invention in its first aspect (including any of the aforementioned preferable/alternative features thereof). The invention may provide an image generated according to the method of the invention in its first aspect (including any of the aforementioned preferable/alternative features thereof).

The invention shall now be described in terms of the following non-limiting examples with reference to the accompanying drawings in which.

Figure 1:
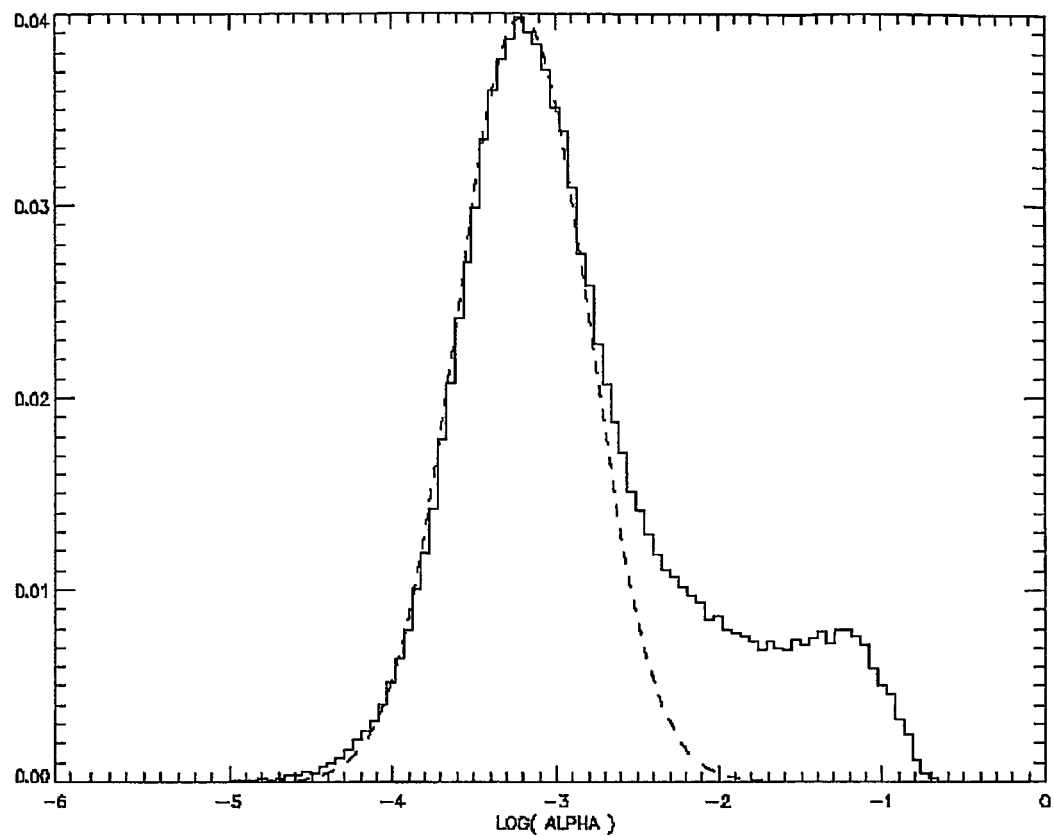
FIG. 1 illustrates the distribution of the natural logarithm of the value of the angle subtended by the time-domain image vectors of each image pixel location of a time-sequence of images relative to the identity vector in the image space of the time-domain image vectors.

In the following, the invention shall be illustrated in terms of the processing of a dynamic image data set recording contrast enhancement in a subject containing a high fat content. The invention shall be describes in its application as a method and means of identifying fat or fatty tissues within an NMR image.

Consider a time-sequence of M separate image datasets each of which contains image data elements acquired by Magnetic Resonance Imaging of a subject immediately before and subsequent to application of an image contrast enhancing agent, and representing the imaged subject in three dimensions (i.e. a volume image). Each volume image is represented as a stack of two-dimensional image frames with lattice dimensions $N_x$, $N_y$, $N_z$ (respectively number of columns and rows in a frame, and a stack length), and total number of image pixels (or "voxels" for a volume image) is $N=N_x \times N_y \times N_z$.

Let $Y_1=(y_{i,1}, \ldots, y_{i,M})$, $i=1, \ldots, N$ be a time-domain image data set (representing a contrast enhancement agent uptake vector, i.e. the vector representation of an uptake curve of a single voxel) of a single voxel at a fixed image point "i" common to each of the M separate image data sets within the sequence. The time-domain image data set is expressed as a vector in M-dimensional Euclidean space wherein each image data item of the time-domain image data set represents a separate vector component of an array of vector components arranged in said time-sequence to form the time-domain image vector $Y_1=(y_{i,1}, \ldots, y_{i,M})$.

One may distinguish between non- and low-enhancing tissues, such as fat, and the tissues enhancing to a high extent.

We assume that each uptake vector belongs to a certain class corresponding to a tissue of specific kind. The dispersion/differences in image pixel values of corresponded temporal points of the time-domain image vectors (uptake vectors) from the same class are only due to the random noise. It follows that $$y_{i,j} \propto \text{Norm}(\mu_{k,j}, \sigma^2), i \in \Lambda_k$$

Where $\Lambda_k$ is a set of uptake vectors that build the $k^{th}$ cluster in the Euclidean space within which the time-domain image vectors are defined. The quantity $\mu_{k,j}$ is the expected value of the j th value (temporal point) of an uptake vector that belongs to the $k^{th}$ cluster, and the quantity $\sigma$ is the standard deviation of the random noise which may, for simplicity, be assumed to be the same for all the dynamic images (this assumption is, however, not necessary).

We shall base our classification on the following model. The dispersion of values of the components $(y_{i,j})$ of an individual time-domain image vector $Y_i=(y_{i,1}, \ldots, y_{i,M})$ (uptake vector) can be modelled by two factors:

(1) contrast enhancement, being induced and due to a deliberate effect, increases the dispersion of the expected values $\mu_{k,l}, \ldots, \mu_{k,M}$ of the corresponded cluster; and, (2) random noise.

For a cluster representing low enhancing tissue, the difference between the temporal points of an uptake curve is mostly due to noise and so the dispersion of the expectation values $\mu_{k,1}, \ldots, \mu_{k,M}$ is small.

It follows that for non-enhancing and low-enhancing tissues the dispersion should be less than is observed in a significantly contrast-enhancing tissue, since the tissue is not subject to a deliberate or significant contrast-enhancing effect, or if there is any such effect it relatively small.

To establish a measure of the enhancement effect, one may find a measure of the dispersion of $\mu_{k,1}, \ldots, \mu_{k,M}$. This may be done using the time-domain vector, $Y_i = (y_{i,1}, \ldots, y_{i,M})$ and the idem (or "identity") vector, $$1_{1 \times M} = \underbrace{(1, \ldots, 1)}_{M}$$

as follows.

Considering the uptake curves as vectors in M-dimensional Euclidean space (as mentioned above), the smaller the dispersion of the expectation values $\mu_{k,1}, \ldots, \mu_{k,M}$, the closer to the idem vector will lay the vectors of the cluster $\Lambda_k$. Thus, the angle ($\alpha$) subtended by a given time-domain image vector with respect to the idem vector in the vector space of the time-domain image vector is determined and employed as a measure of the degree of dispersion present within that vector. This measure reflects both the enhancement effect and the random noise. The effect of noise should be taken into account. One should find a threshold value $\alpha_0$. Should an uptake vector posses value $\alpha > \alpha_0$, the uptake vector reflects significant enhancement. Statistically this is equivalent to testing the hypothesis that the vector represents tissue, possessing enhancement bigger than the non- or low responsive material (e.g. fat) Later we describe how to determine the threshold analysing the distribution of the statistics ($\alpha$).

Assuming that the values of $\alpha$ are small:

$$\alpha_1 \approx tg(\alpha_1) = \frac{\sqrt{\frac{1}{M} \sum_{j=1}^{M} (y_{i,j} - \bar{y}_{i,*})^2}}{\bar{y}_{i,*}} \quad (1)$$

Where $$\bar{y}_{i,*} = \frac{1}{M} \sum_{j=1}^{M} y_{i,j}$$

is the average of the temporal points of the time-domain vector (uptake vector).

The angle ($\alpha$) is determined in respect of all time-domain image vectors (uptake vectors) of all image pixel points of the image volume thereby to generate a corresponding plurality of such angles. It can be straightforward proven mathematically that the values of a will be approximately log-normally distributed. Each cluster, $\Lambda_k$, will possess its own distribution, so for the whole volume one shall have a mixed distribution.

One may determine from the distribution of the values of the angles of all of said time-domain vectors the portion of the angular distribution arising substantially only from the presence within the image subject of a specified low-enhancing tissue (e.g. fat). Once this specified portion has been determined, one may then determine that the contribution to the pixel values of the image data items of a given time-domain image vector (uptake vector) arising from the specified material exceeds a predetermined threshold value if the angle $\alpha$ subtended by that time-domain image vector falls within the specified portion of the angular distribution.

FIG. 1 shows an example of the distribution of the values of $\ln(\alpha)$ for a dynamic breast MR measurement (the solid line). One can see that this is a mixed distribution. One can identify a cluster corresponding to the small values of a (shown by the fitted Normal Distribution (Gaussian) curve - the dashed line). The identified cluster is closer to the idem vector in terms of $\alpha$, i.e. possessing small enhancement effect. It also represents statistically the most significant and uniform fraction of the population. One may conclude that this cluster represents tissue not significantly responsive to contrast agent, such as fat (at least), within the imaged subject. In general, this cluster represents a tissue that is not highly responsive to the contrast agent and which is not the tissue of interest to which the use of the contrast agent was directed. Hereafter, we shall refer to the identified cluster as a "cluster of fat" to simplify the discussion.

Figure 2:
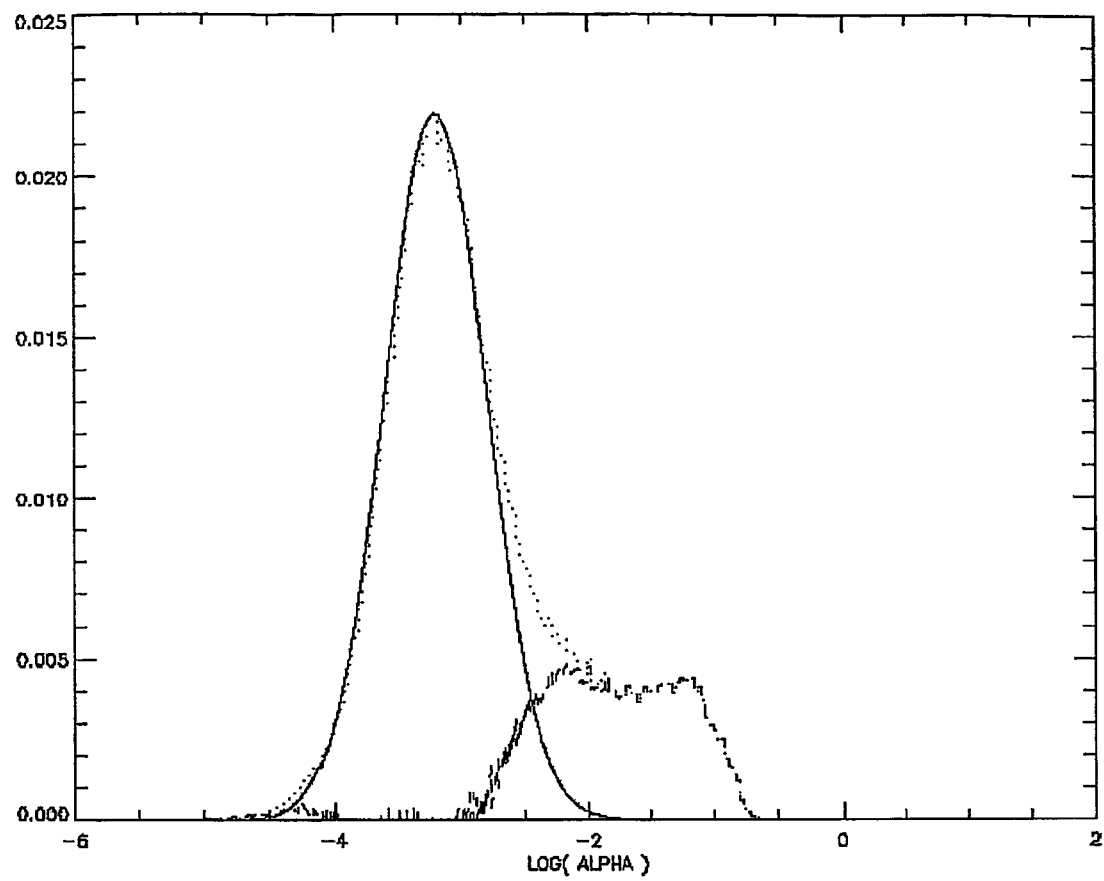
FIG. 2 illustrates a decomposition of the distribution illustrated in FIG. 1 into a Normal component most closely corresponding with a Normal Distribution, and a residual component being the difference between the Normal component and the distribution of FIG. 1.

Fitting the normal distribution curve (the dashed line of FIG. 1) to the fat cluster, the whole angular distribution (dotted curve of FIG. 2) can be decomposed into normal fraction (the solid curve of FIG. 2) representing fat and the residual fraction shown as the dashed curve at the right in FIG. 2. The residual fraction is a mixed distribution corresponding to the enhancing tissues in the imaged subject. The significantly enhancing tissues are much more heterogeneous than fat, and therefore fall in a number of small overlapping clusters. Using the decomposed distribution one can find the optimal threshold, $\alpha_0$, discriminating between normal (fat) and residual populations using for example ROC technique [DJ Fink, D. Christiansen (editors), Electronics Engineers' Handbook, McGraw-Hill, 3rd edition, (1989): section 25 pp. 119-120].

Alternatively, one may wish to select a conservative threshold that discriminates only fat tissue without risk of loss of any valuable information. It is easy to see on FIG. 2 that the threshold corresponds to $\ln(\alpha) \approx -2.8$. The suppression of image effects caused by fat is done by replacing by a zero-vector the time-domain image vectors (uptake vectors) $Y_i = (y_{i,1}, y_{i,M})$ in the time-sequence of separate image data sets (the matrix D below) which possess a value of the angle $\alpha < \alpha_0$ (i.e. replacement: $Y_i \rightarrow (0, \ldots, 0)$).

Alternatively, or additionally, the threshold may be determined and applied via a decomposition of the time-domain image vectors via a Principal Component Analysis (PCA) as follows.

Let D be a dynamic image matrix those columns are separates time-domain image vectors (uptake vectors) $Y_i = (y_{i,1}, \ldots, y_{i,M})$ for respective separates image pixel locations "i", and each row is formed from the complete contents of successive of the M separate datasets of the time-sequence, as follows $$D = \begin{bmatrix} y_{1,1} & \cdots & y_{N,1} \\ \vdots & \ddots & \vdots \\ y_{1,M} & \cdots & y_{N,M} \end{bmatrix}$$

Let $p_j(p_1, \ldots p_M)$ be the $j^{th}$ principal component (PC) vector and is the $i^{th}$ column in P.

The value $$Z_{j,i} = (p_j)'Y_i = \sum_{k=1}^{M} p_{j,k} \cdot y_{i,k}; \; j = 1, \ldots, M; \; i = 1, \ldots, N$$

is the value of the j th principle component of $i^{th}$ time-domain image vector (uptake vector).

The order of the principal component vectors in P depends upon the order of the corresponded eigenvalues ($\lambda_k$) thereof, such that $\lambda_1 > \lambda_{22} > \ldots > \lambda_M$.

Figure 3:
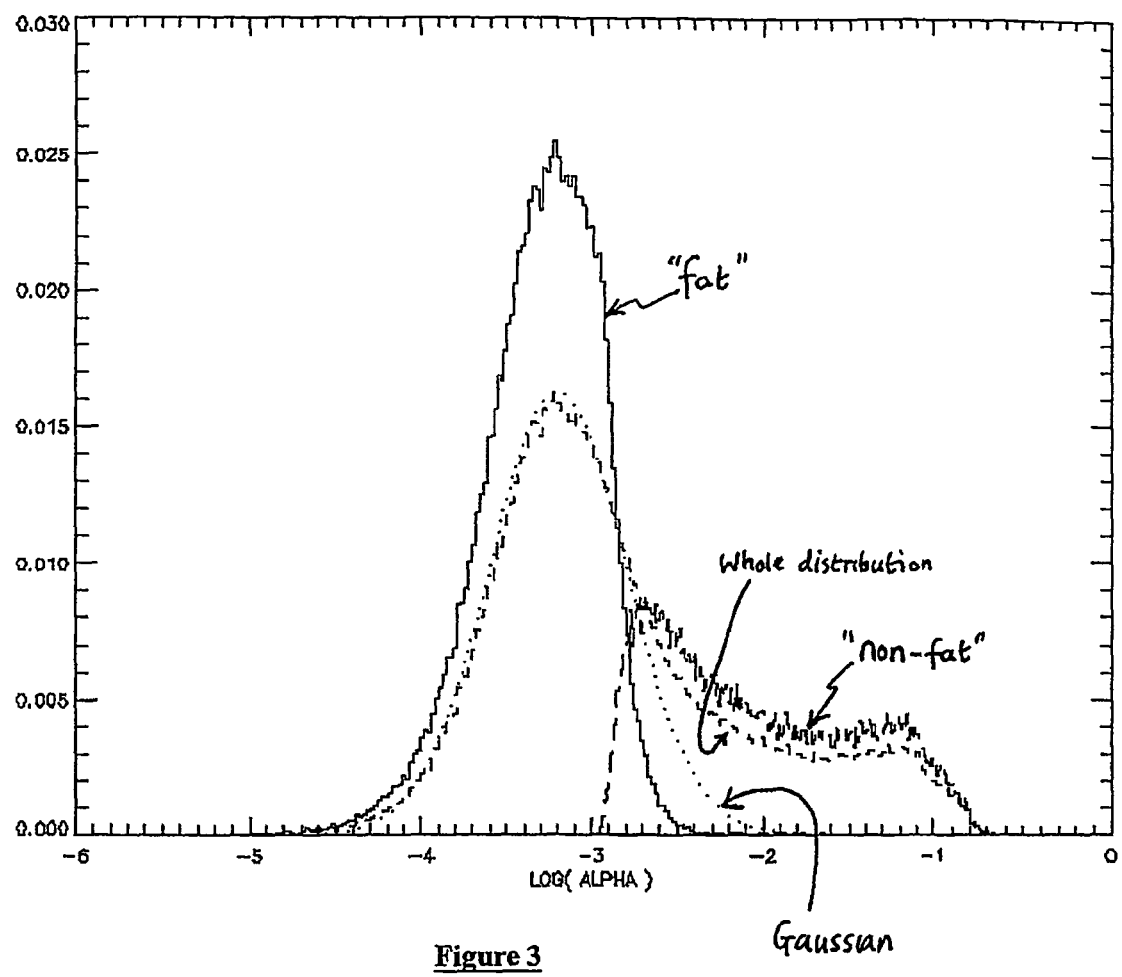
FIG. 3 illustrates a decomposition of the distribution illustrated in FIG. 1 into two fractions ("fat" and "non fat") discriminated using the value of the second principal component with threshold value equal to zero.

It has been found that second principal component is associated with the statistical measure ($\alpha$), and that these two quantities possess a strong negative correlation. Analysis of regression of the correlation of these two quantities has demonstrated that the value of the second principal component $Z_{2,i}=0$ approximates the value of the threshold $\lambda_0$. It follows that if $Z_{2,i}>0$ then the vector $Y_i$ belongs to the "fat cluster"; otherwise the vector $Y_i$ represents significantly enhancing tissue. (In other words, one may say that the above described "fat cluster" falls on the positive extent of the $2^{nd}$ principal component.) In effect, the $2^{nd}$ principle component is a statistical measure of enhancement equivalent to $\alpha$. It should be understood that alternatives to the use of $Z_{2,i}=0$ as a threshold value (of $2^{nd}$ principal component) could in principle be used. FIG. 3 shows distributions of $\ln(\alpha)$ for populations classified as "fat" and "non-fat" using the described above PCA approach. One can see that the result coincides very well with the aforementioned conservative threshold technique illustrated in FIG. 2 (the whole distribution and the Gaussian distribution are also shown for comparison—not normalised).

It should be noted that if the aforementioned angular distribution method (a statistics) is employed, background noise (i.e. noise of empty background surrounding the imaged subject) may obscure the optimal threshold, and therefore is preferably removed.

Figure 4:
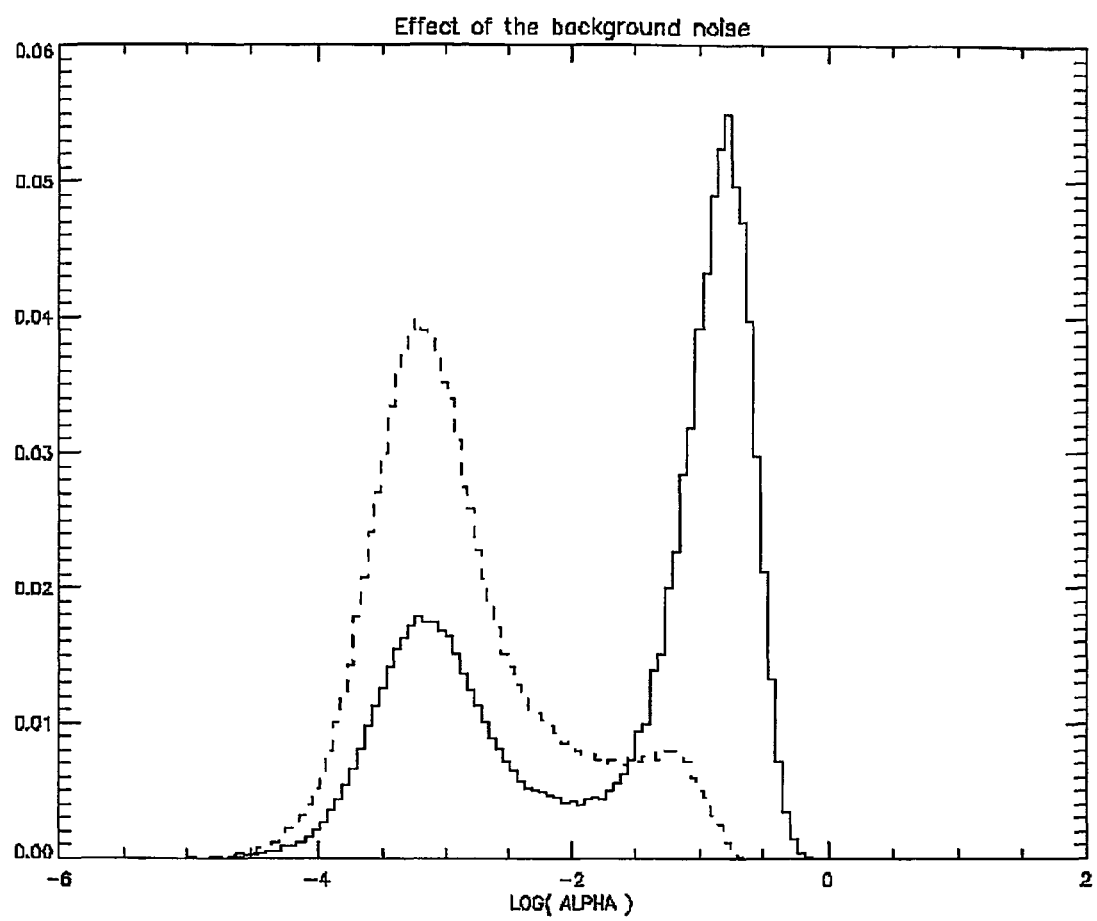
FIG. 4 illustrates the effects upon the distribution of FIG. 1 of not removing background noise from the distribution (such removal having occurred in the distribution of FIG. 1)

FIG. 4 illustrates the effects upon the distribution of FIG. 1 of not removing background noise (the solid line of FIG. 4) from the distribution (such removal having occurred in the distribution of FIG. 1, reproduced as the dashed line in FIG. 4). However, one can see from FIG. 4 that the background noise overlaps mainly with the significantly enhancing tissues. The PCA approach is robust to the background noise.

The present invention may also permit as estimation of tissue-specific contrast enhancement effects as follows.

One may describe the time-domain image vector (uptake vector data) using the following linear model $$Y_i = B_i b + H_i h_k + \epsilon_i, \; i \in \Lambda_k, \; k=1, 2, \quad (2)$$

The first term in eq. 2 is a baseline term. The second term describes the specific effect of cluster $\Lambda_k$, such that the vector $(B_i b + H_i h_k)$ is collinear with the centroid vector of the $k^{th}$ cluster, where $\mu_k = (\mu_{k,1}, \ldots, \mu_{k,2})$ is the centroid vector whose components are the expectation values $\mu_{k,1}, \ldots, \mu_{k,2}$. The last term, $\epsilon_i$, is the residual vector. The vectors $b, h_k$ are unit vectors. It is also required that $b \perp h_k \perp \epsilon$, for all i,k. It follows straightforwardly from the definition of the model that the residual term contains only random noise. Indeed, the random noise is defined as $Y_i - \mu_k$. According to the above discussion, $\epsilon_i \perp \mu_k$ and, therefore, contains only the component of random noise that is orthogonal to $\mu_k$. The complimentary component of noise (i.e. one collinear with $\mu_k$) is spread across the first and second Principal Components (largest and next-largest) of the time-domain image vector (i.e. the first two terms of equation (3) below).

Existing subtraction imaging techniques define a baseline term as $Y_{i,1}$ where $Y_{i,1}$ is the first, pre-contrast point of the uptake vector $Y_i$ and 1 is the identity vector. These existing techniques estimate the enhancement effect merely as $Y_i - Y_{i,1}$, thereby leaving the noise "inside" the image data.

Compare the equation (2) with the following PCA decomposition of Y:

$$Y_i = \sum_{n=1}^{M} Z_{n,i} p_n, \quad p_1 \perp \ldots \perp p_M \quad (3)$$

The PCA decomposition is a generic linear model of the data where the meaning of each particular term is unknown. However, by postulating equivalence of equation (2) and equation (3) one may assume that:
  (1) the first Principal Component of the series in equation (3), namely the quantity $Z_{1,i} p_1$, is a "baseline" term;
  (2) a few mid-Components describe the specific enhancement effect; and,
  (3) the remaining Principal Components represents the noise which may be discarded from the PCA representation of $Y_i$.

Any suitable methods, such as would be readily apparent to the skilled person, may be employed to determine the most suitable value for the cut-off number m<M being the value such that each $j^{th}$ (j>m) principal component can be deemed to contain noise and can be "safely" discarded.

Thus the specific tissue effect (arising from significantly enhancing tissues) can be estimated using the following equation $$Y_i^* = H_i h = \sum_{k=2}^{m} Z_{k,i} p_k \quad (4)$$

In effect this is subtraction of the baseline and residual terms of equation (2). Subtraction of this information from the time-domain image vectors will result in minimisation of the redundant information in the image vectors such that those vectors, and the information within them, therefore, represent substantially only the effects specific to tissue enhancement post-contrast.

Thus, the method of image processing may also include representing the time-domain image vector in terms of a principal component decomposition thereof employing all principal component vectors and corresponding principal component values thereof except: those principal component values thereof not exceeding a predetermined magnitude; and/or the largest principal component value thereof; and,
  replacing by a value determined according to the principal component decomposition of the pixel value of each image data item of each of the plurality of the separate image data sets identified as being suitable for use in the generation of an image of the subject.

The invention, in a preferred embodiment, provides a method of processing a time-sequence of separate image data sets (each being either 2D or 3D) which records development of contrast enhancement in an imaged subject into which a contrast-enhancing agent has been introduced, the method containing some or all of the following steps:
  1. PCA decomposition of the time-domain vector for each pixel location within the time-sequence of separate image data sets; followed by,
  2. Suppression of image noise due to the random (and low-enhancing) effects (e.g. of fat) within an imaged subject as described above; followed by, 3. Estimation the specific enhancement effect by representing each time-domain image vector according to equation (4) (and optionally, the data can be de-noised removing a few last terms in the PCA series after estimation of the noise cut-off term number m).

It is to be understood that the present invention may provide means arranged to, or suitable for, the implementation of the image processing method of the invention. Accordingly, it is to be understood that the present invention encompasses such means.

The image processing may be performed on any suitable image processing means (e.g. a computer work station) which preferably includes image forming means for forming an image from image data having been processed by the image processing means according to the invention.

The invention may provide a computer program product (e.g. computer disk or other means for carrying/storing a computer program readable by a computer) containing a computer program for performing the processing method. The invention may provide a computer program for performing the method according to the invention.

Figure 5A:
FIG. 5(a) illustrates a sequence of post-contrast images processed according to the present invention (post-contrast time is incrementing from left to right)

FIG. 5(a) shows the sequence of post-contrast images resulted from using the suggested approach. The background grey colour in each image outlines eliminated fatty tissue. The first image of the sequence on the left is a first post-injection image. Rest of the images are ordered according to their acquisition times from left to right. The image of the same subject generated according to known image subtraction techniques, and produced using the same sequence of datasets as that used for FIG. 5(a), is shown for comparison on FIG. 5(b). The time-sequence of datasets used for the example consists of seven image volumes: two pre- and five post-contrast, performed after administration of Gd-DTPA. Temporal resolution was 90 sec. The data sets were acquired using 3D T1-weighted fast spoiled gradient echo sequence, on 1.5T Siemens scanner.

Figure 5B:
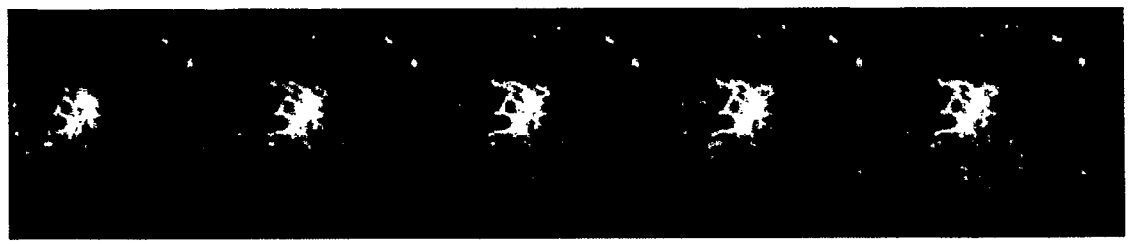
FIG. 5(b) illustrates a sequence of post-contrast subtraction images according to known methods.
Figure 5C:
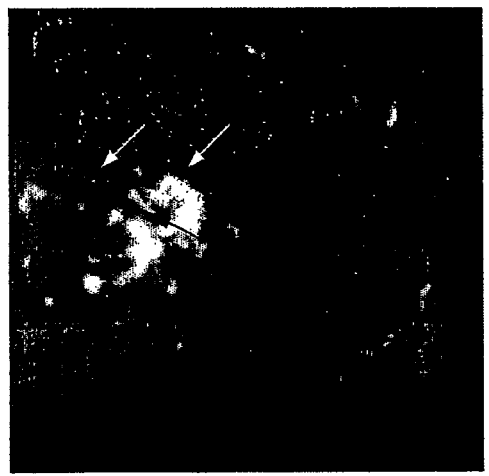
FIG. 5(c) illustrates an enlarged first image of the sequence illustrated by FIG. 5(a)

One can see granularities in the lesion and differences between tissues due to the contrast dynamics illustrated in FIG. 5(a) that are not seen on the corresponded subtracted image of FIG. 5(b). Comparison of these characteristics with ones of the anatomically identifiable tissues is used for understanding of the structure of the lesion. FIG. 5(c) shows zoomed first image of the sequence of processed post-contrast images presented in FIG. 5(a). The dark area at the top of the lesion (pointed by the white arrow) was later identified as a blood vessel. The dark area at the centre (black arrow) is a compact region (shape has been assessed using an orthogonal display), and therefore most likely is part of the tumour that becomes enhanced later than the surrounding tissue.

Figure 6A:
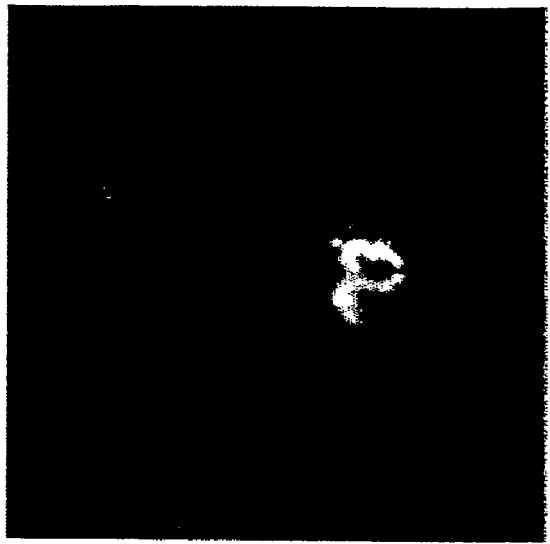
FIG. 6(a) illustrates an image processed according to the present invention.
Figure 6B:
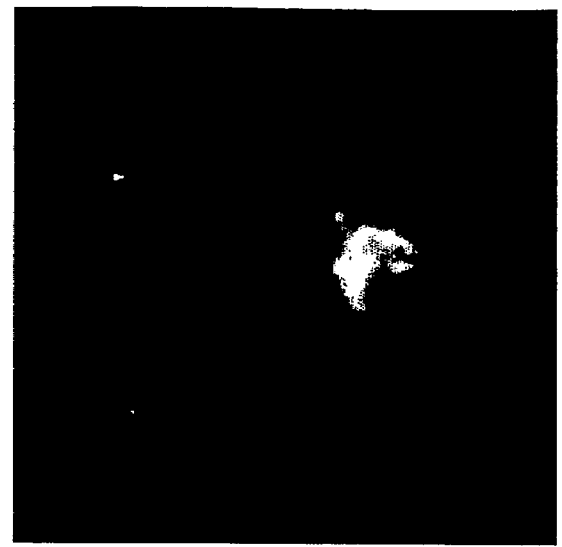
FIG. 6(b) illustrates a post-contrast subtraction image according to known methods.

FIGS. 6(a) and (b) show another example of an image processed according to the present invention (FIG. 6(a)) and one generated by simple subtraction of datasets (FIG. 6(b)). In FIG. 6(a) one can see a dark region in the middle of the lesion. This non-homogeneity is not seen on the corresponding subtracted image of FIG. 6(b). The method was initially valuated using 24 studies. In all the cases the approach has been shown more informative that the traditional subtracted image technique. Suppression of the ill-effects of fat upon a contrast-enhancement image significantly reduces the amount of data to be analysed. This results in faster and more reliable localisation of lesion, and the tumour contour is clearly defined. The method provides a capability of fast visual and reliable analysis of the data that is otherwise available only from analysis of individual uptake curves. Visualisation of differences in the dynamic contrast characteristics of the tissue provides a way for discrimination between tumour and blood vessels, and identification of granularities.

The complete elimination of the fatty tissue surrounding the lesion identifies the tumour's contour clearly, and provides a straightforward way for segmenting tumour extent and extracting features.

A further example of the present invention shall now be described.

Effective fat suppression in images is of major importance for dynamic contrast enhanced MRI of the breast. Current approaches rely on subtraction, fat saturation or water excitation. Selective saturation or excitation require high field uniformity that can often present a challenge. Subtraction imaging will not completely remove fat, since fatty tissue is enhancing to some small extent. In addition subtraction increases noise of resulted difference image, and as a result the tumour outline is not always well defined.

The following example of the invention provides a "fat suppression" method based on multivariate statistical analysis and modelling of individual voxel (or pixel) dynamic contrast agent uptake curves. That is to say, the following example method provides a method which enables one to identify and remove from the image dataset the uptake curves that belong to fatty tissue. In addition, the method transforms the dynamic data into a new 4D dataset (one temporal dimension and three spatial dimensions) with maximised contrast between the enhancing tissues and improved contrast for lesions. The method demonstrates capabilities of identification of a lesion's boundary or contour, inhomogeneities, and visualisation of spatio-temporal patterns of contrast enhancement on T1-weighted dynamic studies.

The method was applied to 16 Gd-DTPA dynamic studies acquired on 1.5 Tesla scanners using T1-weighted fast spoiled gradient echo sequence. In all the cases anatomically correct fat suppression was observed comparing the results with corresponded subtracted and fat-saturated images.

The method provides a way of producing dynamic images combining high spatial and temporal resolution with fat suppression. The method is robust to non-uniformity of the magnetic field and heterogeneities of tissues.

Dynamic contrast enhanced MRI (DCE-MRI) is an effective tool for diagnosis of breast cancer. The diagnosis relies on a number of features including among others the lesion's shape and spatio-temporal pattern of contrast enhancement. Analysis of the shape can only be reliable if the lesion's extent is properly segmented.

Applying specific linear transformation to the uptake vectors, the current approach described herein improves contrast between tissues with different contrast enhancement dynamics. This provides a way of detecting granularity in a lesion and discriminating between lesion and functional tissue. The approach operates on feature spaces of unlimited dimensions.

A dynamic dataset can be considered as a set of uptake vectors $u_i = (u_{i,1}, \ldots, u_{i,M})^T$ each of those represents a time evolution of signal intensity of a voxel at specific spatial location denoted by the index $i=1, \ldots, N$ through the sequence of M consecutively acquired volumes (i.e. an intensity uptake curve of the i-th voxel), and $(\,)^T$ denotes transpose operation (vectors will be considered as column vectors.)

We assume that each uptake vector belongs to a certain cluster or group of such vectors possessing multivariate normal distribution. The members of the same cluster possess physiologically the same uptake curve form and the observed differences with the cluster are only due to the random noise. Assuming that values of white noise at different time points of the same uptake curve are uncorrelated and equivalently distributed, the scatter within the clusters is assumed isotropic. Because of effects of heterogeneity of the tissues and non-uniformity of magnetic field, each tissue will be represented by a number of such clusters. It is assumed that those factors affect the signal in fat by a spatial location specific multiplier. Thus the mean vectors of the clusters representing the fatty tissue will be collinear:

$$\mu_k = H_k \cdot \mu_F, k=1, 2, \quad (5)$$

There $H_k$ is a multiplying factor, and $\mu_F$ is a normalized to unit length vector denoting the direction, shared by the mean vectors $\mu_k = (\mu_{i,1}, \ldots, \mu_{i,M})^T$ of the fat clusters (hereafter $\mu_F$ will be referred to as normalized signature vector of fat). If the vector $\mu_F$ is known (its estimation will be discussed below), the following linear transformation will create a new feature space where the mean vectors of the fat clusters are aligned with the zero vector:

$$v_i = u_i - (\mu_F, u_i) \cdot \mu_F = (E - \mu_F \cdot \mu_F^T) \cdot u_i, i=1, \ldots N \quad (6)$$

where $(\mu_F, u_i)$ denotes dot product, and E is the identity matrix. Applying expectation operator to eq. 6 and then substituting $\mu_k$ according to eq. 5, one can show that the expectation of a feature vector $v_i$ is a zero-vector if the corresponding uptake vector $u_i$ belongs to one of the clusters representing fat. Hereafter the vectors $u_i$ will be referred to as original uptake vectors, and $v_i$—as residual uptake vectors.

The transform defined by eq. 6 can be interpreted geometrically as subtraction from each original uptake vector of its projection on the axis defined by the normalized signature vector of fat $\mu_F$. It follows that the transform matrix $E - \mu_F \cdot \mu_F^T$ is singular and its rank (and therefore the dimension of the new feature space) is M-1. According to the above discussion, the residual uptake vectors of fat will posses a single cluster with zero mean vector and isotropic scatter. The residual uptake vectors of non-fatty tissues will demonstrate differences in contrast agent uptake dynamics as compared to the fat, and will obviously possess significantly non-Gaussian mixture of multivariate distributions.

To discriminate the feature vectors of fat and non-fatty tissues, one may apply principal component analysis (PCA). PCA will search for a new orthogonal basis in the space of residual uptake vectors maximizing consecutively variance of the projections on each of the axes. Since the residual uptake vectors of fat have normal distribution with zero mean vector and isotropic scatter, their contribution to the total variance of the projections will be isotropic, and for any axis, the projections of the residual vectors of fat will possess normal distribution with zero mean. Thus the search will be driven by variability of the residual uptake vectors of the tissues other than fat. The first (i.e. the most significant) principal component accounts for the most variability in the data, and, therefore, it will be maximally associated with the differences between fat and non-fatty tissues.

The eigenimage of the first principal component (i.e. an image whose voxels/pixels are values of the first principal component of the corresponded residual uptake vectors) will visualise differences in effect of contrast enhancement between fat and other tissues, and the fatty tissue on this image will be presented as a random noise with zero mean.

Figure 7:
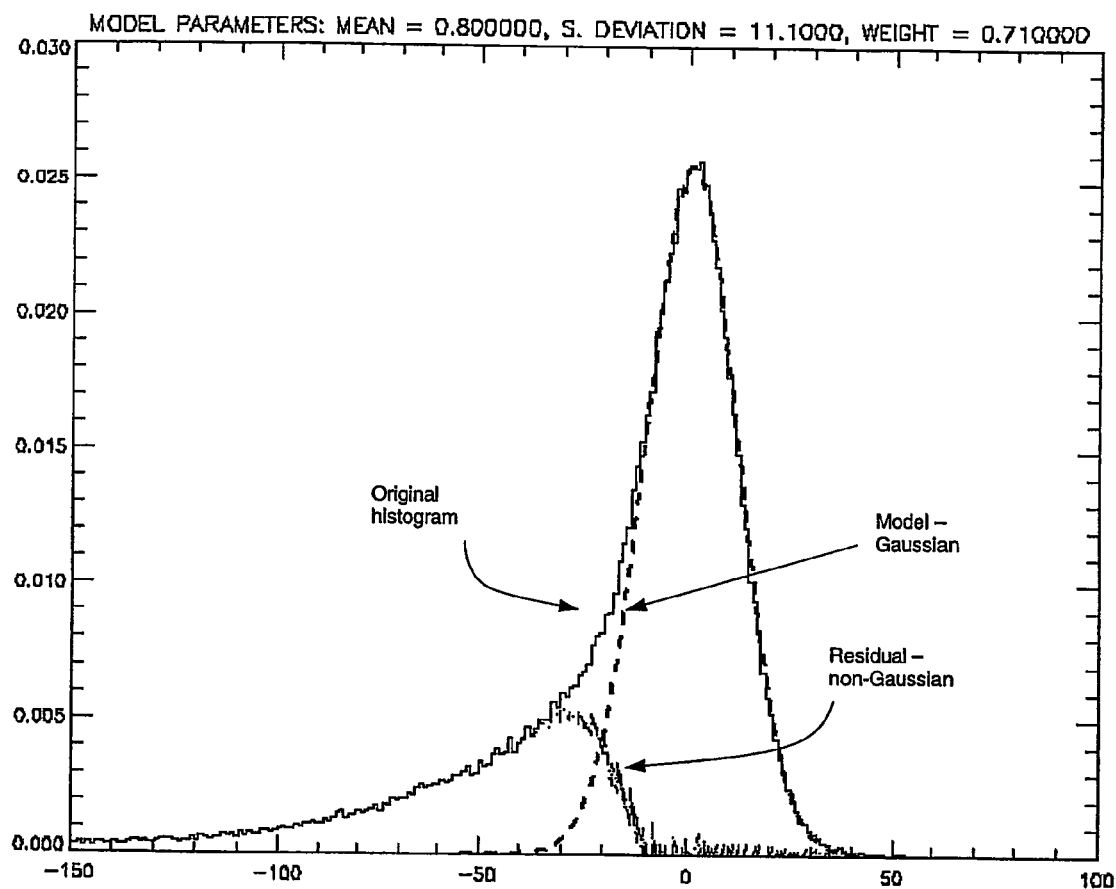
FIG. 7 illustrates a histogram of first principal components.

Fitting the model normal distribution as shown in FIG. 7, decomposes the distribution of values of the first principal components into a Gaussian fraction modelling the cluster of fatty tissue, and the residual non-Gaussian fraction. Applying receiver operation characteristic (ROC) analysis, the optimal threshold discriminating the fractions is found. Finally, using this threshold, a mask of fatty tissue is created and used for elimination of fatty tissue from the images by performing a masking operation.

The mask will be a binary image of the same lattice dimensions as the original images where i-th voxel will be substituted by value 1, if the vector $v_i$ was classified as representing non-fatty tissue, and zero otherwise. The operation of masking mentioned above is, therefore, voxel wise multiplication of an image and the mask. The optimal threshold can also be found interactively adjusting the threshold and simultaneously observing that no important details are cut off on the eigenimage.

FIG. 7 illustrates a histogram of the values of first principal components of the residual uptake vectors (the data is from one of the examples discussed later). The Gauss curve modelling the fat cluster in the feature space is fitted varying mean and standard deviation of the Gauss curve and the weight of Gaussian fraction in the mixture.

Perfusion of fat is much slower than of the other tissues, and typical dynamic measurement shows only the beginning of the distribution phase terminating long before the equilibrium. At these conditions, we will consider enhancement of fat as approximately linear, i.e. $\mu_F$ will be approximated as a linear function of time post contrast agent administration:

$$\mu_{Fj} = A \cdot (1 + r \cdot t_j), j=1, \ldots, M \quad (7)$$

where r is relative rate of enhancement of signal in fat due to the contrast agent, $t_j$-time of acquisition of the j-th volume measured since contrast agent administration, and A is a constant normalizing the vector to unit length. The following iterative procedure is used to estimate the rate of enhancement r. Applying increasing values of r, starting from r=0, the transformation defined by eq. 6 is computed followed by PCA of the residual uptake vectors. Then the Gauss model is fitted as discussed above. Finally, the accepted value of the parameter is one resulting in the Gauss curve with the centroid point closest to the zero.

PCA is known as a good tool to find axes separating mixtures of multivariate Gaussian distributions. The PCA applied to the uptake vectors before performing the transform defined by the eq. 6 will outline the axis $\mu_F$.

Figure 8:
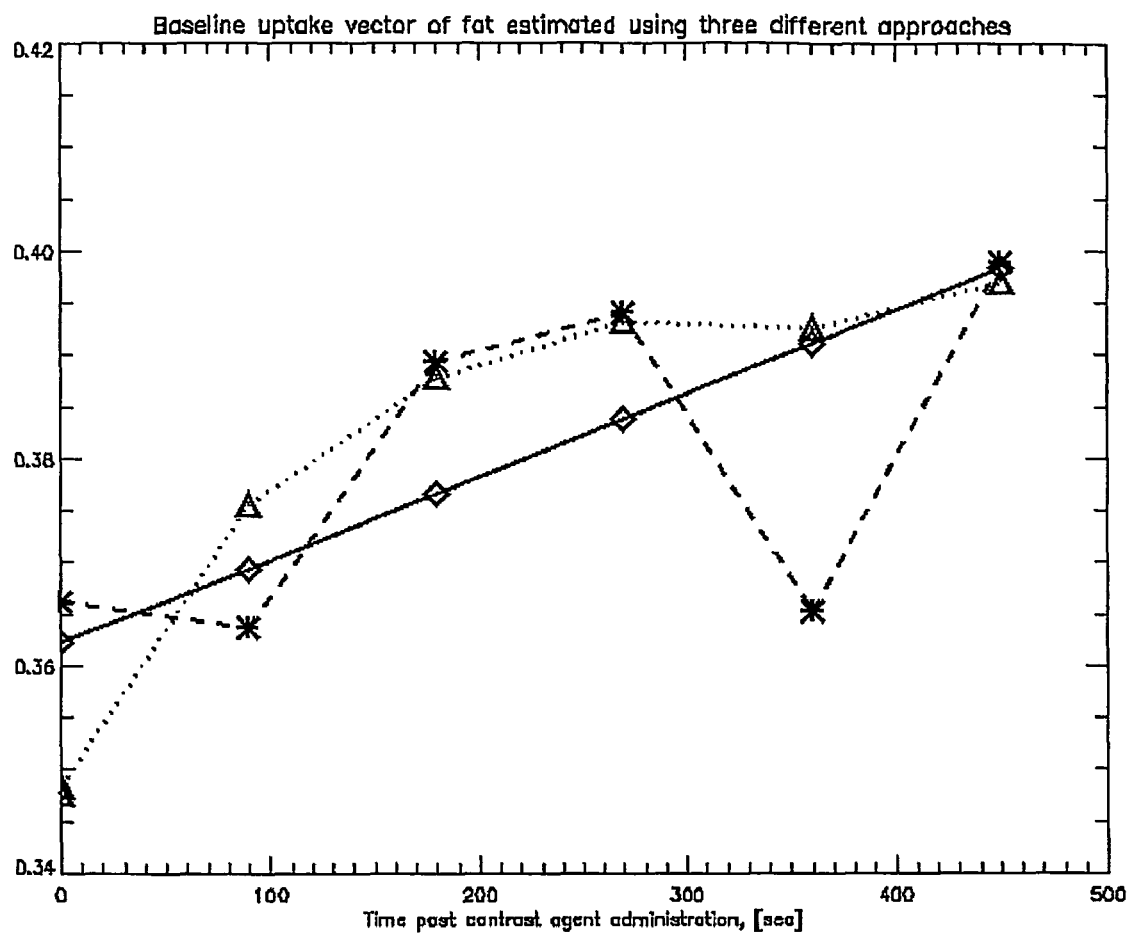
FIG. 8 illustrates a normalised uptake curve, a time-development of a first principal component of an uptake vector, and a linear uptake model.

It was found that the first (i.e. the most significant) principal component of the uptake vectors is very close to $\mu_F$, and can be used as its rough estimate of (FIG. 8). The most significant of the remaining principal components (in this case the second) may be used as an axis for discriminant analysis. This principal component vector is identified as one possessing the smallest angle with the identity vector (a vector of equal values).

The method can be combined with PCA based approached for noise reduction by reconstructing the uptake vectors back from their principal components values discarding non-significant principal components.

FIG. 8 illustrates the result of three different estimation methods for estimating the normalized signature vector of fat: solid line—linear model; dotted—first principle component vector of the original uptake vectors; dashed—average uptake curve of ROI selected within fatty tissue (ROI size—100 voxels), this last method is crude and it is shown only for the purpose of comparison.

The present approach was applied to 16 dynamic studies of patients at genetic risk of breast cancer. Each study consists of two pre-contrast and at least four post-contrast datasets acquired using a 3D T1-weighted fast spoiled gradient echo (FLASH) sequence with TE=10-14 ms, TR=4.2-5 ms, and flip angle −35° on 1.5T scanners of various models (mainly Siemens Magnetom and GE Signa). The contrast agent was Gd-DTPA administrated by intravenous bolus injection. Temporal resolution was 90 sec. in most cases. Image stack plane orientation was coronal, with the matrix size 256×128 voxels and corresponding spatial resolution 1.33×1.33 mm. Number of slices was 64 to 60, and slice thickness 2.5 mm. As part of the study protocol, 3D T1-weighted fat-saturated image was acquired using similar sequence with higher spatial resolution 0.66×0.89 nm (matrix size 512×384).

The data was previously checked for motion, and the background was segmented applying threshold on length of the uptake vectors. For each case a mask of fat tissue was computed as discussed. To verify the correctness of the method, the mask was applied to subtraction image, and the result was compared with the original (i.e. unmasked) subtraction image. In all the cases anatomically correct fat suppression was observed. The normalized signature vector of fat was computed both using iterative algorithm and PCA of the original uptake vectors. In both cases similar mask images were obtained. The values of parameter r of eq. 7 were in the range 0.1-0.15.

Finally the computed mask was applied to the dataset of residual uptake vectors. It was found that the produced images have improved contrast for enhancing lesions comparing to the subtracted images. Here we present two examples.

FIGS. 9(a) to 9(f) and FIGS. 10(a) to 10(d) present a study of a patient with invasive carcinoma (mixed lobular and no specific type (ductal) carcinoma, grade II.) Examples using the data of this study were demonstrated earlier (FIGS. 7 and 8).

Figures 9A, 9B, 9C:
FIG. 9a to 9f illustrate a subject image and comparison images subject to different image processing.
Figures 9D, 9E, 9F:
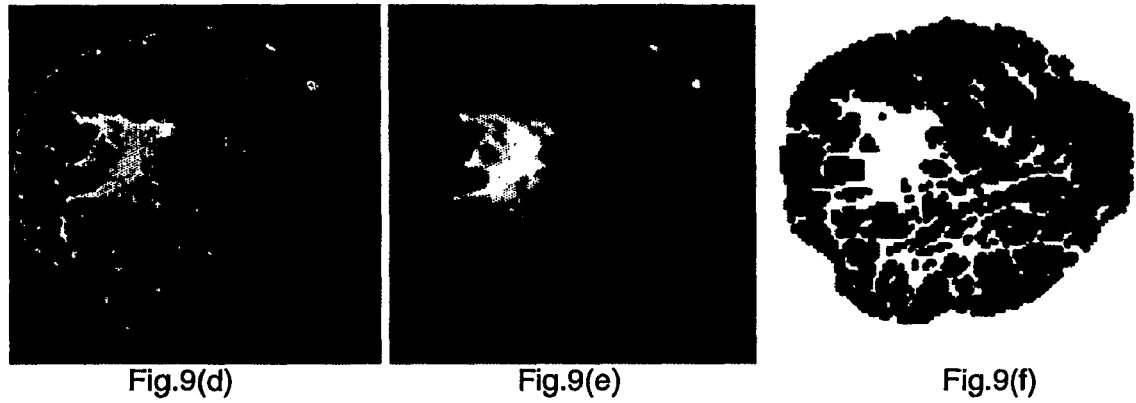
Figure 10A:
FIGS. 10a to 10d illustrate a subject image and comparison images subject to different image processing.
Figure 10B:
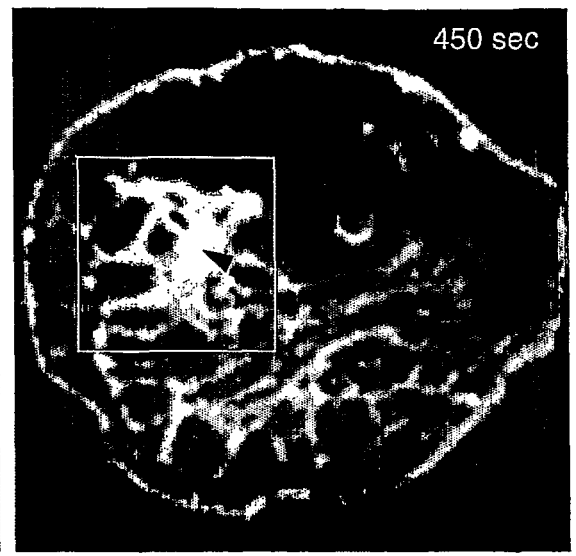
Figure 10C:
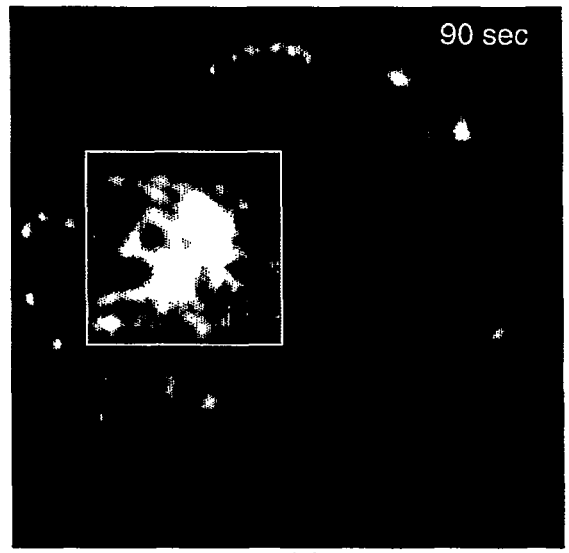
Figure 10D:
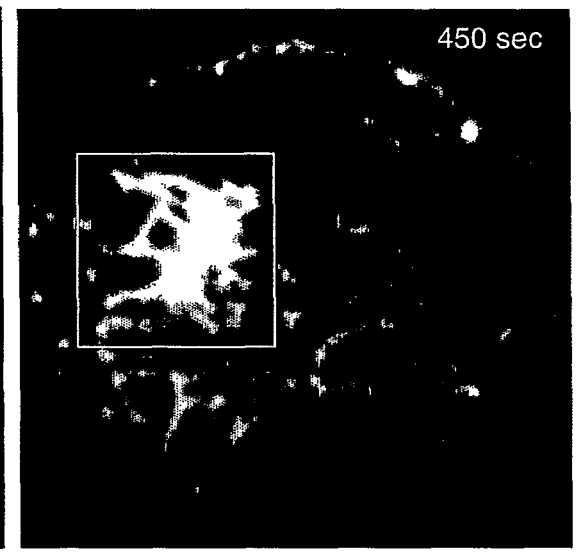

FIG. 9(a) illustrates a subtracted image of a dataset acquired at 450 sec post contrast agent administration after applying fat mask and de-noising using PCA; FIG. 9(b) illustrates the original subtracted image; FIG. 9(c) illustrates the difference image of (a) and (b). For further comparison there is illustrated: FIG. 9(d) shows high resolution image with fat saturation (spatial resolution 0.66×0.89×2.5 mm); FIG. 9(e) shows an eigenimage of the $1^{st}$ principal component of the feature vectors; and FIG. 9(f) shows a computed binary mask of fatty tissue.

The lesion is shown by arrow on FIG. 9(a).

In FIG. 10(a)-(d) is shown a sequence of post-contrast images after transformation according to the eq. 7 and fat bit masking FIGS. 10(a,b), and corresponding sequence of subtracted images FIGS. 10(c,d). Post-administration time is printed on the images. The lesion is boxed in all the images. Comparing the sequences one can see anatomically correct fat suppression. The backgrounds of the FIGS. 10(a,b) vary since the images contain signed values, and the background grey colour corresponds to the value of zero that outlines the suppressed (i.e. masked out) fat. One can see granularity of the lesion better than it is seen on the corresponded subtracted images. Comparison of these characteristics with ones of the anatomically identifiable tissues is used for understanding of the structure of the lesion. The dark area at the top of the lesion (pointed by the white arrow) was identified as a blood vessel. The dark area at the centre (black arrow) is a compact region (shape has been assessed using an orthogonal display), and therefore most likely is part of the tumour that becomes enhanced later than the periphery, that is seen comparing the images 10(a) and 10(b).

Figure 11A:
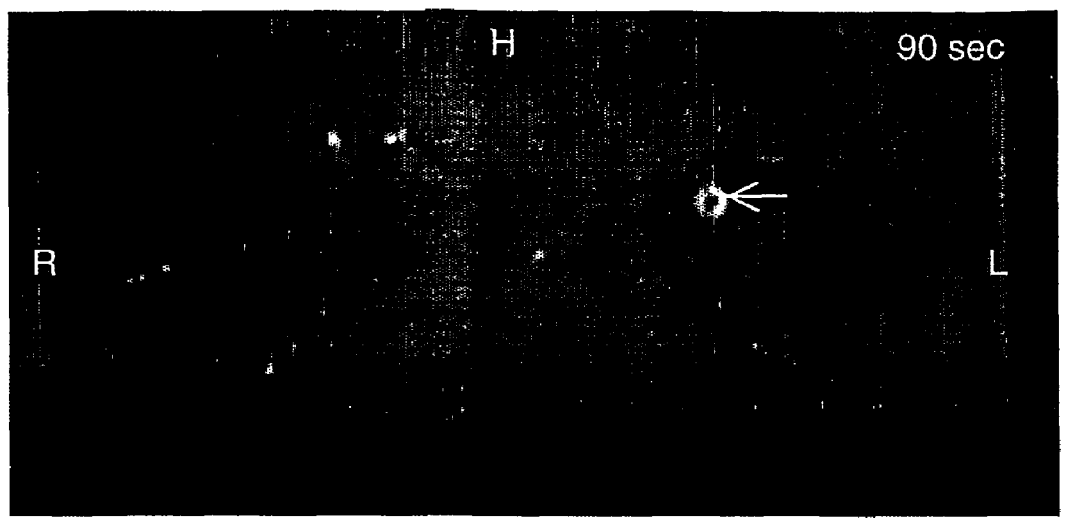
FIGS. 11a to 11c illustrate a sequence of processed images and a high-resolution comparison image.
Figure 11B:
Figure 11C:
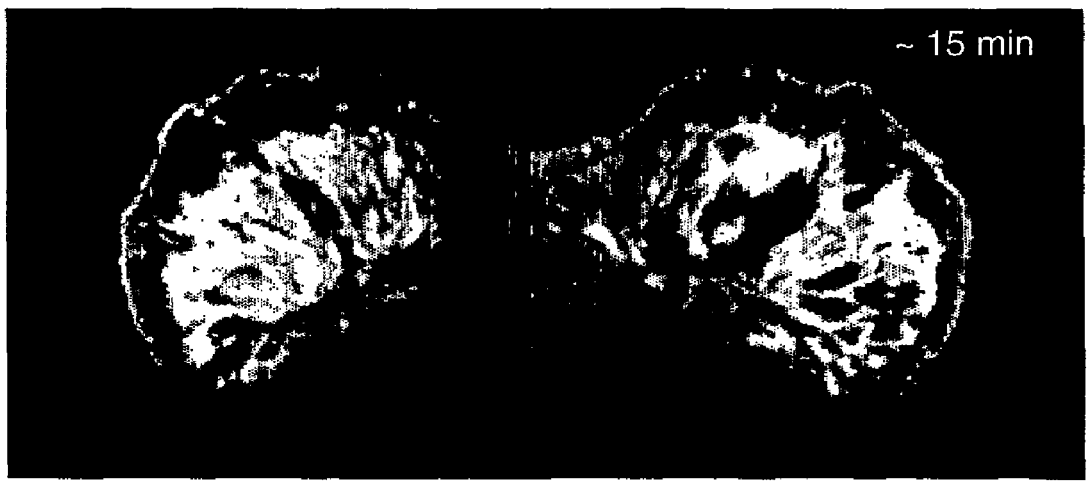

FIGS. 11(a) to 11(c) demonstrate another study of a patient with invasive ductal carcinoma (grade II). Comparing to the previous example, this example demonstrates denser parenchyma, and therefore of interest. Both studies were acquired using Siemens Magnetom scanner.

FIGS. 11(a) and 11(b) illustrate a sequence of processed images. The lesion is in the left breast (shown by arrow). Ring type enhancement is clearly demonstrated comparing the images. FIG. 11(c) is provided for further comparison and was obtained at higher resolution T1 weighted image with fat saturation.

Elimination of fatty tissue from the dynamic dataset significantly reduces the amount of data to be analysed, and suggested linear transformation of the dataset improves contrast for functional and lesion tissues. This may result in faster and more reliable localisation of lesion, and the tumour contour is clearly defined. Visualisation of differences in the dynamic contrast characteristics of the tissue enables analysis of spatio-temporal pattern of contrast enhancement, identification of lesion's granularity and discrimination between lesion and attached healthy tissues (e.g. blood vessels). In the cases when lesion is surrounded by fatty tissue, the complete elimination of fat identifies the tumour's contour clearly, and provides a straightforward way for segmenting tumour extent and feature extraction.

The method provides a classification tool, which is robust to tissue heterogeneity and non-uniformity of magnetic field. Also the method does not require feature space dimension reduction (other existing clustering approaches operate on 3D feature spaces.)

The method has been described in terms of Breast MR imaging. However, it can be applied to other types of dynamic MR studies as will be readily apparent to the skilled person. Modifications and variants to the above embodiments, such as would be readily apparent to the skilled person, are encompassed within the scope of the present invention.

The invention claimed is:

1. A method of processing a time-sequence of separate image data sets which record induced changes in pixel values of successive images of a subject, each set comprising a plurality of image data items which each represent the location of an image pixel of the image subject according to a common reference frame within which the subject is located, the method including the steps of:
   (a) selecting from each of a plurality of said separate image data sets an image data item which represents an image pixel located at the same fixed image pixel location, thereby to generate a time-domain image data set containing only image data items which represent an image pixel at the same said image pixel location;
   (b) determining according to a measure of said induced changes as between all of the pixel values of the image data items of the time-domain image data set whether the image data items thereof are associated with the presence of a specified tissue within the image subject, which includes:
   forming a time-domain image vector wherein each image data item of the time-domain image data set represents a separate vector component of the time-domain image vector, and determining the measure according to a property of the time-domain image vector;
   wherein, said measure is determined according to the degree to which a time-domain image vector differs from an identity vector.

2. A method according to claim 1 including an additional step (c), following step (b), of identifying the image data items of the time-domain image data set as being unsuitable for use in the generation of an image of the subject after having been identified in step (b) as associated with the presence of the specified tissue within the image subject if the specified tissue is of a type which it is not desired to be included within the image of the subject.

3. A method according to claim 2 in which steps (a) to (c) are repeated in respect of each pixel of each of said time-sequence of separate image data sets.

4. A method according to claim 1 wherein the measure is defined according to the dispersion of the values of pixel intensity associated with the image data items within the time-domain image data set.

5. A method according to claim 1 wherein the image data items of the time-domain image data set are determined as being associated with the presence of the specified tissue within the image subject if the measure exceeds a predetermined threshold value.

6. A method according to claim 1 including:
determining the second principal component of the time-domain image vector; and, employing the value of said second principal component as said measure.

7. A method according to claim 6 wherein the predetermined threshold value is exceeded if the value of the second principal component is greater than zero.

8. A method according to claim 1 including the additional step of:
(d) replacing by a value of zero the pixel value of each image data item of each of said plurality of said separate image data sets identified as being unsuitable for use in the generation of an image of the subject.

9. A method according to claim 1 including:
representing the time-domain image vector in terms of a principal component decomposition thereof employing all principal component vectors and corresponding principal component values thereof except: the largest principal component value thereof; and those principal component values thereof not exceeding a predetermined magnitude; replacing by a value determined according to said principal component decomposition the pixel value of each image data item of each of said plurality of said separate image data sets identified as being suitable for use in the generation of an image of the subject.

10. A method according to claim 1 including forming an image from image data comprised in said time-sequence of separate image data sets.

11. A method of processing a time-sequence of separate image data sets which record induced changes in pixel values of successive images of a subject, each set comprising a plurality of image data items which each represent the location of an image pixel of the image subject according to a common reference frame within which the subject is located, the method including the steps of:
(a) selecting from each of a plurality of said separate image data sets an image data item which represents an image pixel located at the same fixed image pixel location, thereby to generate a time-domain image data set containing only image data items which represent an image pixel at the same said image pixel location;
(b) determining according to a measure of said induced changes as between all of the pixel values of the image data items of the time-domain image data set whether the image data items thereof are associated with the presence of a specified tissue within the image subject, which includes:
forming a time-domain image vector wherein each image data item of the time-domain image data set represents a separate vector component of the time-domain image vector, and determining the measure according to a property of the time-domain image vector;
determining the angle subtended by the time-domain image vector with respect to the identity vector in the vector space of the time-domain image vector; and, employing said angle ($\alpha$) as the measure.

12. A method according to claim 11 wherein a predetermined threshold value is exceeded if said angle ($\alpha$) is less than a threshold angle value ($\alpha_o$).

13. A method according to claim 11 including:
repeating step (a) in respect of a plurality of image data items thereby to generate a corresponding plurality of time-domain image data sets;
forming a corresponding plurality of time-domain image vectors with each image data item of a given time-domain image data set representing a separate vector component of the given time-domain image vector;
determining the angle subtended by each of said time-domain image vectors with respect to the identity vector in the vector space of the time-domain image vector; and,
determining from the distribution of the values of said angles of all of said time-domain vectors the portion of said angular distribution arising substantially only from the presence within the image subject of said specified tissue, wherein said predetermined threshold value is exceeded if the said angle subtended by said time-domain image vector falls within said portion of said angular distribution.

14. A method according to claim 13 wherein said threshold angle value ($\alpha_o$) is the angular value which demarcates the portion of the angular distribution arising substantially only from the presence within the image subject of said specified tissue from the other portion(s) of the angular distribution.

15. A method according to claim 13 wherein the angular distribution is the distribution of the natural logarithm of the value of the angles, and said portion of said angular distribution arising substantially only from the presence within the image subject of said specified tissue is determined according to a Normal Distribution having distribution parameters which cause it to most closely correspond with a portion of said angular distribution.

16. Image processing means for processing a time-sequence of separate image data sets which record induced changes in pixel values of successive images of a subject, each set comprising a plurality of image data items which each represent the location of an image pixel of the image subject according to a common reference frame within which the subject is located, the image processing means including:
(a) selection means for selecting from each of a plurality of said separate image data sets an image data item which represents an image pixel located at the same fixed image pixel location, thereby to generate a time-domain image data set containing only image data items which represent an image pixel at the same said image pixel location;
(b) decision means for determining according to a measure of said induced changes as between all of the pixel values of the image data items of the time-domain image data set whether the image data items thereof are associated with the presence of a specified tissue within the image subject;
wherein, said decision means includes:
vector means arranged to form a time-domain image vector wherein each image data item of the time-domain image data set represents a separate vector component of the time-domain image vector, and
measure determining means arranged to determine the measure according to a property of the time-domain image vector; and
wherein, said measure is determined according to the degree to which a time-domain image vector differs from an identity vector.

17. The image processing means according to claim 16 including identifying means arranged to identify the image data items of the time-domain image data set as being unsuitable for use in the generation of an image of the subject if they are identified by said decision means (b) as being associated with the presence of the specified tissue within the image subject and if the specified tissue is of a type which it is not desired to be included within the image of the subject.

18. Image processing means according to claim 16 wherein the measure is defined according to a measure of the dispersion of the values of pixel intensity associated with the image data items within the time-domain image data set.

19. Image processing means according to claim 16 wherein the image data items of the time-domain image data set are determined as being associated with the presence of the specified tissue within the image subject if the measure exceeds a predetermined threshold value.

20. Image processing means according to claim 16 including: principal component means arranged to determine the second principal component of the time-domain image vector; and, said decision means is arranged to employ the value of said second principal component as said measure.

21. Image processing apparatus according to claim 20 wherein the predetermined threshold value is exceeded if the value of the second principal component is greater than zero.

22. Image processing means according to claim 16 including:
(d) data modifying means arranged to replace by a value of zero the pixel value of each image data item of each of said plurality of said separate image data sets identified as being unsuitable for use in the generation of an image of the subject.

23. Image processing means according to claim 16 wherein said principal component means is arranged to represent the time-domain image vector in terms of a principal component decomposition thereof employing all principal component vectors and corresponding principal component values thereof except:
the largest principal component value thereof; and those principal component values thereof not exceeding a predetermined magnitude; the image processing means including data modifying means arranged to replace by a value determined according to said principal component decomposition the pixel value of each image data item of each of said plurality of said separate image data sets identified as being suitable for use in the generation of an image of the subject.

24. Image processing means according to claim 16 arranged to so process each pixel of each of said time-sequence of separate image data sets.

25. Image processing means according to claim 16 including image forming means for forming an image from image data comprised in said time-sequence of separate image data sets having been processed by said image processing means.

26. Image processing means for processing a time-sequence of separate image data sets which record induced changes in pixel values of successive images of a subject, each set comprising a plurality of image data items which each represent the location of an image pixel of the image subject according to a common reference frame within which the subject is located, the image processing means including:
(a) selection means for selecting from each of a plurality of said separate image data sets an image data item which represents an image pixel located at the same fixed image pixel location, thereby to generate a time-domain image data set containing only image data items which represent an image pixel at the same said image pixel location;
(b) decision means for determining according to a measure of said induced changes as between all of the pixel values of the image data items of the time-domain image data set whether the image data items thereof are associated with the presence of a specified tissue within the image subject;
wherein, said decision means includes:
vector means arranged to form a time-domain image vector wherein each image data item of the time-domain image data set represents a separate vector component of the time-domain image vector, and
measure determining means arranged to determine the measure according to a property of the time-domain image vector;
angle determining means arranged to determine the angle ($\alpha$) subtended by the time-domain image vector with respect to the identity vector in the vector space of the time-domain image vector; and,
said decision means is arranged to employ said angle (a) as the predetermined measure.

27. Image processing means according to claim 26 wherein a predetermined threshold value is exceeded if said angle ($\alpha$) is less than a threshold angle value ($\alpha_o$).

28. Image processing means for processing a time-sequence of separate image data sets which record induced changes in pixel values of successive images of a subject, each set comprising a plurality of image data items which each represent the location of an image pixel of the image subject according to a common reference frame within which the subject is located, the image processing means including:
(a) selection means for selecting from each of a plurality of said separate image data sets an image data item which represents an image pixel located at the same fixed image pixel location, thereby to generate a time-domain image data set containing only image data items which represent an image pixel at the same said image pixel location;
(b) decision means for determining according to a measure of said induced changes as between all of the pixel values of the image data items of the time-domain image data set whether the image data items thereof are associated with the presence of a specified tissue within the image subject; wherein,
said selection means is arranged to generate in respect of a plurality of image data items a corresponding plurality of said time-domain image data sets;
said vector means is arranged to form a corresponding plurality of time-domain image vectors with each image data item of a given time-domain image data set representing a separate vector component of the given time-domain image vector;
said angle determining means is arranged to determine the angle subtended by each of said time-domain image vectors with respect to the identity vector in the vector space of the time-domain image vector; and,
said decision means is arranged to determine from the distribution of the values of said angles of all of said time-domain vectors the portion of said angular distribution arising substantially only from the presence of a specified tissue within the image subject, wherein a predetermined threshold value is exceeded if the said angle subtended by said time-domain image vector falls within said portion of said angular distribution.

29. Image processing means according to claim 28 wherein said threshold angle value ($\alpha_0$) is the angular value which demarcates the portion of the angular distribution arising substantially only from said specified tissue from the other portion(s) of the angular distribution.

30. Image processing means according to claim 28 wherein the angular distribution is the distribution of the natural logarithm of the value of the angles, and said decision means is arranged to determine said portion of said angular distribution arising substantially only from said specified tissue according to a Normal Distribution having distribution parameters which cause it to most closely correspond with a portion of said angular distribution.

31. A method of processing a time-sequence of separate image data sets which record induced changes in pixel values of successive images of a subject, each set comprising a plurality of image data items which each represent the location of an image pixel of the image subject according to a common reference frame within which the subject is located, the method including the steps of:
   (a) selecting from each of a plurality of said separate image data sets an image data item which represents an image pixel located at the same fixed image pixel location, thereby to generate a time-domain image data set containing only image data items which represent an image pixel at the same said image pixel location;
   (b) determining according to a measure of said induced changes as between all of the pixel values of the image data items of the time-domain image data set whether the image data items thereof are associated with the presence of a specified tissue within the image subject;
   wherein, said specified tissue is fat.

32. Image processing means for processing a time-sequence of separate image data sets which record induced changes in pixel values of successive images of a subject, each set comprising a plurality of image data items which each represent the location of an image pixel of the image subject according to a common reference frame within which the subject is located, the image processing means including:
   (a) selection means for selecting from each of a plurality of said separate image data sets an image data item which represents an image pixel located at the same fixed image pixel location, thereby to generate a time-domain image data set containing only image data items which represent an image pixel at the same said image pixel location;
   (b) decision means for determining according to a measure of said induced changes as between all of the pixel values of the image data items of the time-domain image data set whether the image data items thereof are associated with the presence of a specified tissue within the image subject;
   wherein, said specified tissue is fat.

* * * * *